(12) United States Patent
Shi et al.

(10) Patent No.: US 10,735,415 B2
(45) Date of Patent: Aug. 4, 2020

(54) METHOD FOR ACCUMULATING AND CO-ASSEMBLING CONSISTENT DATA

(71) Applicant: SUZHOU SUPERBLOCK CHAIN INFORMATION SCIENCE & TECHNOLOGY CO., LTD., Suzhou (CN)

(72) Inventors: Xingguo Shi, Suzhou (CN); Xingdong Shi, Suzhou (CN); Guangyu Chen, Suzhou (CN)

(73) Assignee: SUZHOU SUPERBLOCK CHAIN INFORMATION SCIENCE & TECHNOLOGY CO., LTD., Suzhou (CN)

( * ) Notice: Subject to any disclaimer, the term of this patent is extended or adjusted under 35 U.S.C. 154(b) by 52 days.

(21) Appl. No.: 16/317,880

(22) PCT Filed: May 12, 2017

(86) PCT No.: PCT/CN2017/084163
§ 371 (c)(1),
(2) Date: Jan. 15, 2019

(87) PCT Pub. No.: WO2018/032817
PCT Pub. Date: Feb. 22, 2018

(65) Prior Publication Data
US 2019/0227851 A1 Jul. 25, 2019

(30) Foreign Application Priority Data
Aug. 18, 2016 (CN) .......................... 2016 1 0686127

(51) Int. Cl.
G06F 9/46 (2006.01)
H04L 29/06 (2006.01)
(Continued)

(52) U.S. Cl.
CPC ........ *H04L 63/0869* (2013.01); *G06F 9/5033* (2013.01); *G06F 9/5061* (2013.01);
(Continued)

(58) Field of Classification Search
CPC ... H04L 9/14; H04L 12/1818; H04L 63/0414; H04L 29/06; H04L 67/1063;
(Continued)

(56) References Cited

U.S. PATENT DOCUMENTS

2012/0284335 A1* 11/2012 Chung ................ H04L 63/0414
709/204
2013/0091540 A1* 4/2013 Chen ............... H04W 12/04031
726/1
(Continued)

*Primary Examiner* — Tuan A Vu
(74) *Attorney, Agent, or Firm* — SV Patent Service

(57) ABSTRACT

A method is disclosed for accumulating and co-assembling consistent data. The method includes: 1) a node A packaging data D into data black $D_A$ according to a generation rule, and broadcasting a mutually trusted assembly invitation; 2) after a node B has approved the mutually trusted assembly invitation, assembling the $D_A$ and a data block $D_B$ of node B according to the generation rule, and returning an assembly result to node A; 3) after node A has validated the assembly result, establishing a mutually trusted partnership between node A and node B; 4) the mutually trusted partner nodes inspecting whether the stored assembly result meets a setting condition of an assembly rule, and if not, the mutually trusted partner nodes respectively broadcasting a mutually trusted assembly invitation to a network; and 5) after a node i has approved the mutually trusted assembly invitation, assembling the assembly result and a data block $D_i$ of the node i according to the generation rule, and returning a new assembly result to the invitation node, after all mutually trusted partner nodes issuing the invitation have approved the new assembly result, storing the new assembly result, and adding node i as a mutually trusted partner.

12 Claims, 4 Drawing Sheets

(51) Int. Cl.
  *H04L 29/08* (2006.01)
  *G06F 9/50* (2006.01)
  *G06F 9/54* (2006.01)
(52) U.S. Cl.
  CPC .............. *G06F 9/542* (2013.01); *H04L 29/06* (2013.01); *H04L 63/123* (2013.01); *H04L 67/1044* (2013.01); *H04L 67/1063* (2013.01); *H04L 67/1095* (2013.01); *H04L 67/16* (2013.01)
(58) Field of Classification Search
  CPC . H04L 67/1044; H04L 67/0869; H04L 67/16; H04W 12/04031; G06F 9/542; G06F 9/5033; G06F 9/5061
  See application file for complete search history.

(56) References Cited

U.S. PATENT DOCUMENTS

2015/0163066 A1* 6/2015 DeRosa .............. H04L 12/1818
  370/250
2018/0337782 A1* 11/2018 Wu ........................... H04L 9/14

* cited by examiner

METHOD FOR ACCUMULATING AND CO-ASSEMBLING CONSISTENT DATA

TECHNICAL FIELD

The invention relates to the field of computer technologies, and specifically to a method of multi-node equivalence examination and coordinated assembling of public sharing data in a parallel network computing environment.

BACKGROUND OF THE INVENTION

There are plenty of storage and processing demands for discrete data in Internet applications. These data possess both logic discreteness and time discreteness features. Traditional business-based data processing method are inefficient and closed. Thereby industry gradually turns to use big data technology to satisfy the reading, writing, and processing demand for such discrete data, which improves performance and extensibility. In consideration of performance and operability, however, big data decreases the demand for data consistency in some degree. Therefore, discrete nodes in network need discrete data hold by separate nodes to form public sharing data and require the data to meet the demand for public consistency on verification logic (e.g. distributed multiple nodes respectively maintain a group of discrete transaction data at the same time and keep global consistency for transactions according to the needs; After multiple processing nodes discretely receive or generate a group of input data respectively, it coordinates to generate a group of publicly recognized consistent data etc.), it should be conducted according to some specific arbitration and coordination mechanism. Current arbitration method includes: central server arbitration, agent node arbitration, and weighted node arbitration.

The above arbitration methods are centralized or quasi-centralized coordinated methods. They need to set and run a group of centralized nodes/semi-centralized nodes. Other nodes register on the node group and use centralized coordination and arbitration mechanism to assemble data and establish consistent verification relation for the data. This is the most regular processing method which distributed computing applies to public sharing data on consistency.

In addition, there are algorithms using POW (power of work) to coordinate node assembling behavior, namely, a POW arbitration method. This method is used in a totally decentralized computing environment.

Above all, in current computing network, the use of centralized arbitration mechanism decrease the parallel feature of the whole system and increase the risk of single point failures. At the same time, the centralized nodes, because of their importance, often become the subject of network attacks and hijacks. Furthermore, centralized arbitration methods are not suitable for decentralized computing scenarios. Moreover, the current POW arbitration method decentralized applications consume a lot of computing resources and suffers from low arbitration efficiency.

SUMMARY OF THE INVENTION

To address the problems in current technologies, the present invention aims to provide a method for accumulating and co-assembling consistent data. The disclosed method uses node trust accumulation and multiplication methods to realize multi-node coordinated assembling of public sharing data with consistent verification relation:

A network node A comprising a local data block $D_A$ and a counterpart network node B comprising a data block $D_B$ examine each other's data block according to a publicly recognized rule $f_{check}$ among nodes. Node A and node B discover each other via broadcasting. Recognized rule $f_{check}$ is pre-defined in node running software or coordinately generated by node A and node B (the same below). Nodes which run the same software usually abide by identical communication protocol and recognized rule. Data blocks which accord with the recognized generation rule $f_{check}$ are regarded as trusted data block, node A and node B respectively assemble to data block group [C] and exchange the results in accordance with the agreed generation rule $f_{check}$. Node A and node B use the generation rule $f_{check}$ to examine each other's assembling result separately. If the assembling results are the same, node A and node B become trusted partners. If the results are different, they neglect each other. Trusted partner nodes regard [C] as its own new data and they repeat previous steps to find other nodes to constantly expand data block group [C] according to the generation rule $f_{check}$, until it reaches to the limitation conditions for generation rule $f_{check}$. Multiple data block can be assembled in the network at the same time. Multiple data block group $[C]_n$ are examined by nodes separately and assembled according to an amalgamation rule $f_{join}$. Amalgamated data block group broadcast to other node to examine. For the result that does not accord with the amalgamation rule, $f_{join}$ is abandoned. The consistent assembling result is broadcasted to the whole network, and is independently examined by nodes in network and encapsulated according to an encapsulation rule $f_{sign}$. Nodes examine each other's encapsulation result via broadcasting. The encapsulation result which is supported by a majority of nodes will be the pubic sharing data block group recognized by participated nodes.

Implementations of the present invention can include the following:

A method for accumulating and co-assembling consistent data includes the following steps:

1) A network node A which has the demand for adding data encapsulates data D as to-be-verified data block $D_A$ according to generation rule $f_{check}$; then node A broadcasts a mutual trust assembling invitation to network;

2) A network node B examines the mutual trust assembling invitation according to generation rule $f_{check}$; if the mutual trust assembling invitation of node A passes the examination, node B assembles data block $D_A$ in the mutual trust assembling invitation and to be verified data block $D_B$ in node B according to generation rule $f_{check}$, then it replies to node A with an assembling result [C];

3) Node A testifies legitimacy of the assembling result [C]; if the result passes the verification, node A replies to node B and forms a mutual trust partner with node B;

4) Nodes which become mutual trust partners examine the stored assembling result [C] to see if it satisfies conditions set by an assembling rule $f_{build}$; if it does not satisfy the conditions, the nodes which become mutual trust partners respectively broadcast mutual trust assembling invitations to network, then it conducts step 5) until the conditions are satisfied; and 5) A network node i examines the received mutual trust assembling invitation according to the generation rule $f_{check}$. If it passes the examination, node i assembles the assembling result [C] in the mutual trust assembling invitation and data block $D_i$ which needs to be verified by node i according to generation rule $f_{check}$, then reply the invitation node with updated assembling result [C]; verifying the updated assembling result [C] by the invitation node according to generation rule $f_{check}$; if it passes the verification, the updated assembling result [C] is sent to other nodes in mutual trust partners and be examined by them; when it successfully passes the examination of all nodes in mutual trust partners, nodes in mutual trust partners save the updated assembling result [C] and add node i to the mutual trust partners.

Furthermore, multiple assembling results coexist in the network. Each of the assembling results corresponds to a group of mutual trust partners. A mutual trust partner group corresponding to an assembling result [C]$_i$ is constructed by nodes that have successfully verified an assembling result i.

Furthermore, the mutual trust partner groups broadcast combination invitations to the whole network. Those nodes which have received the combination invitation within mutual trust partner group examine and record the assembling results of other mutual trust partner groups, to form an assembling result list for successfully verified assembling results. The mutual trust partner groups exchange the assembling result list and select assembling results universally recognized by the mutual trust partner groups, wherein a universally recognized assembling result is used to form a universally recognized data group [C]$_{all}$ according to according to an amalgamation rule $f_{join}$.

Furthermore, all nodes that have participated in process of generating or recognizing the universally recognized data group [C]$_{all}$ independently encapsulate [C]$_{all}$, add consistency verifying data, and obtain public sharing data according to a same encapsulation rule $f_{sign}$. The nodes in the mutual trust partner groups hold the public sharing data and mutual trust relations among the nodes are terminated.

Furthermore, nodes in the network independently examine multiple assembling results, assemble the assembling results which have passed the examination according to the amalgamation rule $f_{join}$, and subsequently send the amalgamated data block group to other nodes to conduct examination, wherein nodes broadcast the data block groups which abide by the amalgamation rule $f_{join}$ to the whole network. Nodes in network conduct independent examination of the data block group and encapsulate the data block group according to encapsulation rule $f_{sign}$. The nodes mutually examine encapsulation results via broadcasting and regard the encapsulation result which is supported by most nodes as public sharing data block group.

Furthermore, when there is only one assembling result [C] in the network, the assembling result [C] correspond to a mutual trust partner group, the assembling result [C] is publicly recognized as public data group [C]$_{all}$.

Furthermore, the mutual trust assembling invitation can include to-be-verified data block D$_A$ and the generation rule $f_{check}$. The mutual trust assembling can contain the current assembling result [C] and the generation rule $f_{check}$.

Furthermore, the generation rule $f_{check}$ can be generated by a pre-defined rule or generated in coordination by several nodes.

Furthermore, the generation rule $f_{check}$ can include verification method information, an assembling order, and an expected chain length.

Furthermore, the setting condition can be the expected chain length.

Furthermore, the generation rule $f_{check}$ can further include $f_{check}$ degree of difficulty and a current trusted chain length.

Furthermore, the in step 3), when node A receives multiple different nodes returned by assembling result [C] and when all the assembling result [C] passes verification, node A can select the verification result first received and replying to corresponding node, wherein the corresponding node becomes a mutual trust partner.

Compared with existing technologies, the present invention includes the following benefits:

Network nodes can automatically organize and jointly assemble consistent data without relying on specific centralized coordination. Data assembling process is open and extensible. The data assembling processes are examined independently by participating nodes. Malicious data and malicious nodes will be neglected which can effectively protect them against malicious attack and unexpected mistakes. Assembled data is held and mutually verified by participating nodes, which can prevent malicious tempering or hijacking. The speed of assembling data is quite high and its assembling scale increases at the scale of $2^n$. It can complete substantial mutual examination and coordination for data and nodes in a short time.

DETAILED DESCRIPTION OF IMPLEMENTATIONS

The technical content of the present invention will be further described in detail with reference to the accompanying drawings.

Implementation Procedure 1

Figure 1A:
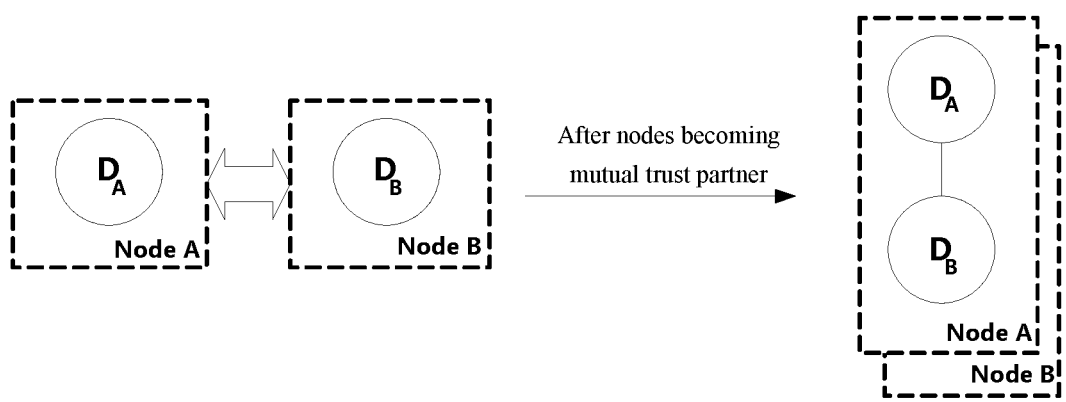
FIG. 1(a)-1(c) illustrate an assembling process of node data in accordance with the present invention: (a) data assembling phase 1; (b) data assembling phase 2; and (c) data assembling phase 3.
Figure 1B:
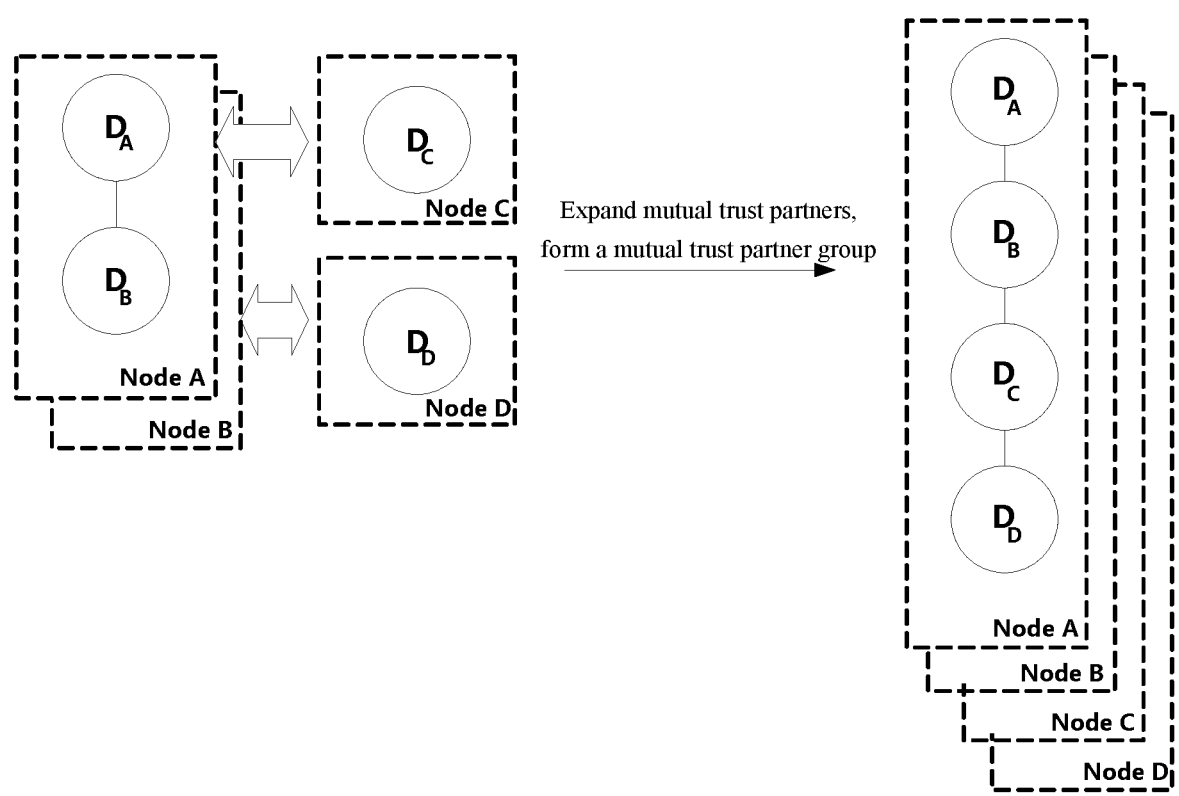
Figure 1:
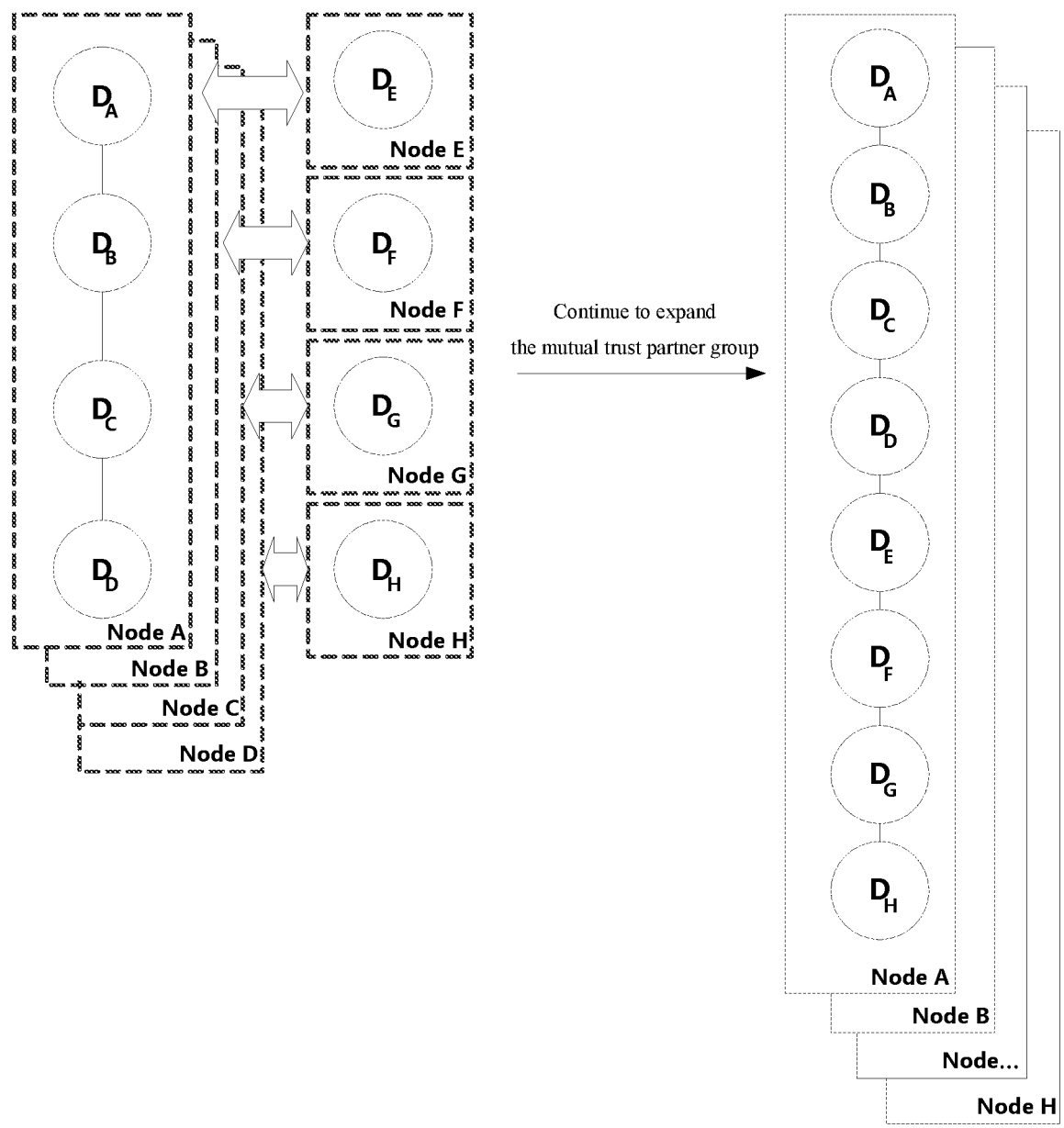
Figure 2:
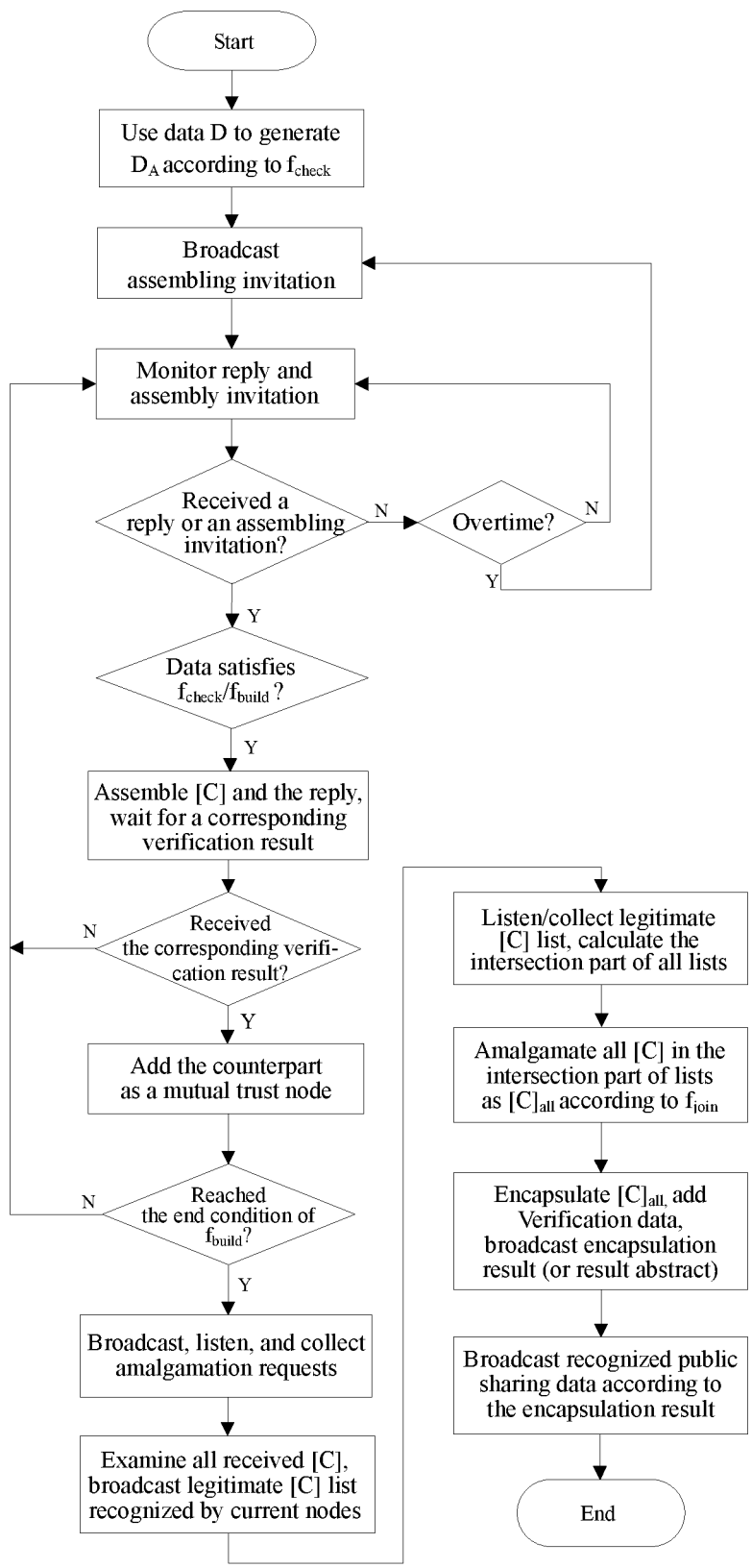
FIG. 2 illustrates a complementation procedure of data assembling node in accordance with the present invention.

1. As shown in FIG. 2, a network node A which has a need for adding data encapsulates self-holding data D as to-be-verified data block D$_A$ according to generation rule $f_{check}$;

2. Node A broadcasts a mutual trust assembling invitation to network. The invitation contains to-be-verified data block D$_A$, a generation rule $f_{check}$ for assembling requirement (including definition for the degree of difficulty, definition for verification method, current reliable chain length, expected chain length, and assembling order, etc.);

3. After a monitoring node B receives the mutual trust assembling invitation, it selects an invitation according to with assembling conditions, examines the legitimacy of the data block in the invitation according to generation rule $f_{check}$. It ignores the request that are inconsistent with assembling expectation, degree of difficulty, verification method, current reliable chain length, and expected chain length, and other illegal requests. It assembles the data in legitimate requests with the to-be-verified data block D$_B$ of node B as {D$_A$, D$_B$}, also known as [C], according to generation rule $f_{check}$ (shown in FIG. 1), then sends the assembling result [C] back to the inviter, namely node A, to request for examination;

4. As the inviter, node A receives the assembling reply and verify the legitimacy of the assembling [C] according to the generation rule $f_{check}$, then replies to the invited one, namely, node B, to become a mutual trust partner. If an assembling reply is illegal, node A neglects the reply, and continues to listen to the reply from other nodes. If the listen process is overtime, step 2 will be repeated;

5. The nodes that have become mutual trust partners are sure to have consistent assembling result [C] and respectively store the assembling result [C] by themselves. If it does not surpass the limitation of expected chain length, it continues to broadcast mutual trust assembling invitation to the network. If it has reached the limitation of expected chain length, which means that [C] has accomplished assembling process, then it skips to step 7;

6. After a node in the mutual trust partners, while listening, receives an assembling invitation/assembling reply, it continues to verify the invitation/reply according to generation rule $f_{check}$. If it is a legitimate assembling result, it is submitted to other nodes of the mutual trust partners to examine the consistency of the assembling result. After it passes the examination of all mutual trust nodes, node A and its mutual trust nodes add the corresponding data block to the new reply in the assembling result [C] (shown in FIG. 1). The new node is added to the mutual trust partners to form a mutual trust partner group, then repeat step 5.

7. Owing to the parallel processes, multiple mutual trust partner groups and multiple assembling results [C] can coexist in the network. Mutual trust partner groups broadcast amalgamation invitations to the network. Meanwhile, they monitor other amalgamation requests in network. The amalgamation invitations packages each contain an assembling result [C] and a recognition domain. The recognition domain indicates that it is an amalgamation invitation. The amalgamation invitation can only broadcast amalgamation invitation package. After nodes respond, it sends the assembling result [C] to its counterpart.

8) Mutual trust partner group collect the listened amalgamation invitation as far as possible. Nodes in mutual trust partner group examine and record the legitimacy of the assembling result [C] in other mutual trust partner groups according to the generation rule $f_{check}$, which finally forms an assembling result [C] list which is recognized by the current group.

9) Mutual trust partner groups exchange the assembling result [C] list which is recognized by each group and select publicly the recognized assembling result [C] to form $[C]_{all}$ according to the amalgamation rule $f_{join}$. $[C]_{all}$ becomes the public data group recognized by mutual trust partner groups; and 10) All nodes which participate in the generation and recognition process of $[C]_{all}$ can independently encapsulate $[C]_{all}$ and add consistency verification data to $[C]_{all}$ according to the same encapsulation rule $f_{sign}$. The encapsulation result is consistent with the result which is calculated by other nodes (or nodes rebroadcast the encapsulation result or the abstract of encapsulation result to confirm the consistency of calculation result). The encapsulation result which obtains recognition from the majority of nodes become the legitimate public sharing data. After data complete encapsulation process, nodes in mutual trust partner groups respectively store the legitimate public sharing data. Mutual trust relations among nodes are terminated. Nodes corresponding to the data which fails to pass the examination and which have been abandoned in the assembling process need to repeat step 1 with its own data D and try to participate in a new round of data assembling.

Implementation Procedure 2

1. As shown in FIG. 2, a network node A that has a need for adding data encapsulates its own data D as to-be-verified data block $D_A$ according to generation rule $f_{check}$.

2. Node A broadcasts a mutual trust assembling invitation to network. The invitation contains to-be-verified data block $D_A$, a generation rule $f_{check}$ for assembling requirement (including definition for the degree of difficulty, definition for verification method, current reliable chain length, expected chain length, and assembling order, etc.);

3. After a monitoring node B receives the mutual trust assembling invitation, it selects an invitation according to assembling conditions, examines the legitimacy of the data block in the invitation according to generation rule $f_{check}$. It ignores the request that are inconsistent with assembling expectation, degree of difficulty, verification method, current reliable chain length, and expected chain length, and other illegal requests. It assembles the data in legitimate requests with the to-be-verified data block $D_B$ of node B as $\{D_A, D_B\}$, also known as [C], according to generation rule $f_{check}$ (shown in FIG. 1), then sends the assembling result [C] back to the inviter, namely node A, to request for examination;

4. As the inviter, node A receives the assembling reply and verifies the legitimacy of the assembling [C] according to the generation rule $f_{check}$, then replies to the invited one, namely, node B, to become a mutual trust partner. If an assembling reply is illegal, node A neglects the reply, and continues to listen to the reply from other nodes. If the listen process is overtime, step 2 will be repeated;

5. The nodes that have become mutual trust partners are sure to have consistent assembling result [C] and respectively store the assembling result [C] by themselves. If it does not surpass the limitation of expected chain length, it continues to broadcast mutual trust assembling invitation to the network. If it has reached the limitation of expected chain length, which means that [C] has accomplished assembling process, then it skips to step 7;

6. After a node in the mutual trust partners, while listening, receives an assembling invitation/assembling reply, it continues to verify the invitation/reply according to generation rule $f_{check}$. If it is a legitimate assembling result, it is submitted to other nodes of the mutual trust partners to add the corresponding data block for the new reply in the assembling result [C] (shown as FIG. 1). The new node is added to the mutual trust partners to form a mutual trust partner group, then repeat step 5;

7. Owing to the parallel processes, multiple mutual trust partner groups and multiple assembling results [C] can coexist in the network. Mutual trust partner groups broadcast amalgamation invitations to the network. Meanwhile, they monitor other amalgamation requests in network;

8. Mutual trust partner group collect the listened amalgamation invitation as far as possible. Nodes in mutual trust partner group examine and record the legitimacy of the assembling result [C] in other mutual trust partner groups according to the generation rule $f_{check}$, which finally forms an assembling result [C] list which is recognized by the current group.

9. Mutual trust partner groups exchange the assembling result [C] list which is recognized by each group and select publicly the recognized assembling result [C] to form $[C]_{all}$ according to the amalgamation rule $f_{join}$. $[C]_{all}$ becomes the public data group recognized by mutual trust partner groups; and 10. All nodes which participate in the generation and recognition process of $[C]_{all}$ can independently encapsulate $[C]_{all}$ and add consistency verification data to $[C]_{all}$ according to the same encapsulation rule $f_{sign}$. Besides the necessary check code, $f_{check}$ and $f_{sign}$ also can be regarded as validation rule and also added to consistency validation data. The encapsulation result is consistent with the result which is calculated by other nodes (or nodes rebroadcast the encapsulation result or the abstract of encapsulation result to confirm the consistency of calculation result), namely, legitimate sharing data. After data complete encapsulation process, nodes in mutual trust partner groups respectively store the legitimate public sharing data. Mutual trust relations among nodes are terminated. Nodes correspond to the data which fails to pass the examination and which have been abandoned in the assembling process need to repeat step 1 with its own data D and try to participate in a new round of data assembling.

Implementation Procedure 3

1. As shown in FIG. 2, a network node A that has a need for adding data encapsulates its own data D as to-be-verified data block $D_A$ according to generation rule $f_{check}$;

2. Node A broadcasts a mutual trust assembling invitation to network. The invitation contains to-be-verified data block $D_A$, a generation rule $f_{check}$ for assembling requirement (including definition for the degree of difficulty, definition for verification method, current reliable chain length, expected chain length, and assembling order, etc.);

3. After a monitoring node B receives the mutual trust assembling invitation, it selects an invitation according to with assembling conditions, examines the legitimacy of the data block in the invitation according to generation rule $f_{check}$. It ignores the request that are inconsistent with assembling expectation, degree of difficulty, verification method, current reliable chain length, and expected chain length, and other illegal requests. It assembles the data in legitimate requests with the to-be-verified data block $D_B$ of node B as $\{D_A, D_B\}$, also known as [C], according to generation rule $f_{check}$ (shown in FIG. 1), then sends the assembling result [C] back to the inviter, namely node A, to request for examination;

4. As the inviter, node A receives the assembling reply and verify the legitimacy of the assembling [C] according to the generation rule $f_{check}$, then replies to the invited one, namely, node B, to become a mutual trust partner. If an assembling reply is illegal, node A neglects the reply, and continues to listen to the reply from other nodes. If the listen process is overtime, step 2 will be repeated;

5. The nodes that have become mutual trust partners are sure to have consistent assembling result [C] and respectively store the assembling result [C] by themselves. If it does not surpass the limitation of expected chain length, it continues to broadcast mutual trust assembling invitation to the network. If it has reached the limitation of expected chain length, which means that [C] has accomplished assembling process, then it skips to step 7;

6. After a node in the mutual trust partners, while listening, receives an assembling invitation/assembling reply, it continues to verify the invitation/reply according to generation rule $f_{check}$. If it is a legitimate assembling result, it is submitted to other nodes of the mutual trust partners to add the corresponding data block for the new reply in the assembling result [C] (shown as FIG. 1). The new node is added to the mutual trust partners to form a mutual trust partner group, then repeat step 5;

7. Mutual trust partner groups collect the received assembling invitations as far as possible. Network nodes prefer to participate in a group which has more mutual trust partners. After a period of time, the most advantageous group becomes a mutual trust group which has the maximum number of mutual trust nodes, namely, the currently biggest mutual trust group in current network; and 8. The biggest mutual trust group broadcasts the request for [C] encapsulation confirmation to the network. Any node has the equal right to participate in encapsulation confirmation. Nodes which recognize the assembling result [C] independently encapsulate the assembling result [C] and add consistent verification data according to the same encapsulation rule $f_{sign}$. The encapsulation result is consistent with the result which is calculated by other nodes (or nodes rebroadcast the encapsulation result or the abstract of encapsulation result to confirm the consistency of calculation result), namely, legitimate sharing data. After data complete encapsulation process, nodes in mutual trust partner groups respectively hold the legitimate public sharing data. Mutual trust relations among nodes are terminated. Nodes correspond to the data which fails to pass the examination and that have been abandoned in assembling process need to repeat step 1 with its own data D and try to participate in a new round of data assembling.

What is claimed is:

1. A method for accumulating and co-assembling consistent data, the method implemented via execution of instructions by computing nodes of a mutual trust network, comprising:
  1) encapsulating data D by node A in a network as the to-be-verified data block $D_A$, wherein node A has a need for adding data, subsequently broadcasting, by node A, a mutual trust assembling invitation to whole network;
  2) examining the mutual trust assembling invitation by node B in the network according to a generation rule $f_{check}$; if the mutual trust assembling invitation from node A passes the examination, assembling the data block $D_A$ in the mutual trust assembling invitation and to-be-verified $D_B$ of node B in node B according to the generation rule $f_{check}$, replying to node A with an assembling result [C];
  3) verifying legitimacy of the assembling result [C] by node A; if verification passes, sending a reply from node A to node B and forming a mutual trust partner of node B;
  4) examining the assembling result [C] by nodes which have formed mutual trust partners to see whether the assembling result [C] satisfies conditions set by an assembling rule $f_{build}$; if it fails to meet the conditions, broadcasting mutual trust assembling invitations respectively by the nodes which have formed mutual trust partners, wherein step 5) is conducted until the conditions are satisfied; and
  5) examining the mutual trust assembling invitation by node i in the network according to the generation rule $f_{check}$; if it passes the examination, combining, at node I, the assembling result [C] in the mutual trust invitation with the to-be-verified data block $D_i$ of node i according to the generation rule $f_{check}$; sending an updated assembling result [C] back to an invitation node; verifying the updated assembling result [C] by the invitation node according to the generation rule $f_{check}$; if the verification passes, sending the updated assembling result [C] from node i to other nodes among mutual trust partners for examination; when it passes examinations conducted by all nodes from mutual trust partners, storing the updated assembling result [C] by the nodes of the mutual trust partner and adding node i to the mutual trust partners.

2. The method according to claim 1, wherein multiple assembling results coexist in the network, wherein each of the assembling results corresponds to a group of mutual trust partners, wherein a mutual trust partner group corresponding to an assembling result $[C]_i$ is constructed by nodes that have successfully verified an assembling result i.

3. The method according to claim 2, wherein mutual trust partner groups broadcast combination invitations to the whole network, wherein nodes which have received the combination invitation within mutual trust partner group examine and record the assembling results of other mutual trust partner groups, to form an assembling result list for successfully verified assembling results, wherein the mutual trust partner groups exchange the assembling result list and select assembling results universally recognized by the mutual trust partner groups, wherein a universally recognized assembling result is used to form a universally recognized data group $[C]_{all}$ according to an amalgamation rule $f_{join}$.

4. The method according to claim 3, wherein all nodes that have participated in process of generating or recognizing the universally recognized data group $[C]_{all}$ independently encapsulate $[C]_{all}$, add consistency verifying data, and obtain public sharing data according to a same encapsulation rule $f_{sign}$, wherein nodes in the mutual trust partner groups hold the public sharing data and mutual trust relations among the nodes are terminated.

5. The method according to claim 2, wherein nodes in the network independently examine multiple assembling results, assemble the assembling results which have passed the examination according to the amalgamation rule $f_{join}$, and subsequently send the amalgamated data block group to other nodes to conduct examination, wherein nodes broadcast the data block groups which abide by the amalgamation rule $f_{join}$ to the whole network, wherein nodes in network conduct independent examination of the data block group and encapsulate the data block group according to an encapsulation rule $f_{sign}$, wherein nodes mutually examine encapsulation results via broadcasting and regard the encapsulation result which is supported by most nodes as public sharing data block group.

6. The method according to claim 1, wherein when there is only one assembling result [C] in the network, wherein the assembling result [C] correspond to a mutual trust partner group, wherein the assembling result [C] is publicly recognized as public data group $[C]_{all}$.

7. The method according to claim 1, wherein the mutual trust assembling invitation includes to-be-verified data block $D_A$ and the generation rule $f_{check}$, wherein the mutual trust assembling contains the current assembling result [C] and the generation rule $f_{check}$.

8. The method according to claim 1, wherein the generation rule $f_{check}$ is generated by a pre-defined rule or generated in coordination by several nodes.

9. The method according to claim 1, wherein the generation rule $f_{check}$ includes verification method information, an assembling order, and an expected chain length.

10. The method according to claim 9, wherein the setting condition is the expected chain length.

11. The method according to claim 9, wherein the generation rule $f_{check}$ further includes $f_{check}$ degree of difficulty and a current trusted chain length.

12. The method according to claim 1, wherein the in step 3), when node A receives multiple different nodes returned by assembling result [C] and when all the assembling result [C] passes verification, selecting, by node A, the verification result first received and replying to corresponding node, wherein the corresponding node becomes a mutual trust partner.

* * * * *